United States Patent [19]

Berneburg et al.

[11] Patent Number: 4,928,645
[45] Date of Patent: May 29, 1990

[54] CERAMIC COMPOSITE VALVE FOR INTERNAL COMBUSTION ENGINES AND THE LIKE

[75] Inventors: Philip L. Berneburg, Potomac, Md.; Roy W. Rice, Alexandria, Va.

[73] Assignee: W.R. Grace & Co.-Conn., New York, N.Y.

[21] Appl. No.: 406,997

[22] Filed: Sep. 14, 1989

[51] Int. Cl.$^5$ .............................................. F01L 3/02
[52] U.S. Cl. .............................. 123/188 AA; 251/368
[58] Field of Search ................. 123/188 AA; 251/368

[56] References Cited

U.S. PATENT DOCUMENTS

| | | | |
|---|---|---|---|
| 2,051,313 | 8/1936 | Olenick | 123/90.37 |
| 2,124,702 | 7/1938 | Jacoby | 123/90.37 |
| 4,359,022 | 11/1982 | Nakamura et al. | 123/188 AA |
| 4,554,898 | 11/1985 | Yamada et al. | 123/188 AA |
| 4,597,367 | 7/1986 | Hayashi | 251/368 |

*Primary Examiner*—E. Rollins Cross
*Attorney, Agent, or Firm*—Edward J. Cabic

[57] ABSTRACT

A ceramic composite valve for an internal combustion engine or the like is disclosed. The valve includes (a) an elongated valve stem shaped for insertion in the valve guide of an engine and comprising a ceramic sleeving which is packed with an axially aligned unidirectional cluster of ceramic reinforcing fibers; and (b) a ceramic bell shaped for mating with the valve seat of an engine and containing discontinuous ceramic fibers; one end of said sleeving being molded into the bell to form a valve-shaped structure; and said valve shaped structure being impregnated and rigidized with a matrix of carbon, other ceramic material, or both carbon and other ceramic material, and coated with a hard ceramic coating which is resistant to oxidation and wear. Also disclosed are various preform valves, and a method of making ceramic valves and preform valves.

26 Claims, 1 Drawing Sheet

CERAMIC COMPOSITE VALVE FOR INTERNAL COMBUSTION ENGINES AND THE LIKE

FIELD OF THE INVENTION

This invention relates to ceramic structures which are made of a ceramic fiber composite and more particularly to ceramic-based valve structures suitable for use in internal combustion engines and the like.

BACKGROUND OF THE INVENTION

Improvements in valves for internal combustion engines and the like have been increasingly sought because of the key role they play in both the engine performance and the mean time between overhaul of engines. Key needs are to reduce valve mass for better response and to reduce wear while maintaining or improving reliability; all with moderate cost. Thus, while valves are typically metal, ceramics such as $Si_3N_4$ are being evaluated for engine valves because of their lower density (about 40% that of steels), their high hardness, their tolerance of heat, and their resistance to corrosion, wear, and erosion. However, reliability has been a serious concern with ceramics due to their "catastrophic failure mode".

SUMMARY OF THE INVENTION

A method has now been developed for making a ceramic composite valve, which is considered especially suitable for use in internal combustion engines and the like. The valve provides the lightness, hardness, and heat resistance normally associated with ceramics while adding impact toughness and shatter-resistance. Finished valves are generally produced by fabricating a preform valve comprising a stem portion and a bell portion as described herein and then further processing the preform valve to provide a suitable finished valve. The preform valve is a composite comprising an elongated stem portion of fibrous ceramic sleeving which is shaped for insertion in the valve guide of an engine, and is packed with an axially aligned unidirectional cluster of ceramic reinforcing fibers. The ceramic sleeving is preferably braided. One end of the sleeving is molded into the bell portion of the valve. The bell portion is a ceramic material containing discontinuous ceramic fibers, and is shaped for mating with the valve seat of an engine. The stem fibers (both the fibers of the fibrous material of the sleeving and the cluster of fibers enclosed within) provide internal reinforcement to the bell portion. The shaped valve structure is suitably impregnated and rigidized either during or after shaping of the stem and bell with a matrix of carbon and/or other suitable ceramic material to yield a densified ceramic fiber-reinforced composite valve preform. The densified preform valve can be finished (e.g. using chemical vapor deposition treatment) to yield a valve which is light and is highly resistant to wear, impact, stress, heat, and engine fumes; and which has favorable dimensional stability over the range of internal combustion engine operating temperatures.

It is an object of this invention to provide a relatively light weight valve which can be fabricated to provide the hardness, high-temperature capability and wear resistance necessary for use in internal combustion engines and the like.

It is a further object to provide a ceramic composite valve with resistance to the catastrophic failure mode normally typical of monolithic ceramics.

It is a further object to provide a ceramic composite that is relatively easily made at reasonable cost.

Further objects, features, and advantages of the invention will be apparent from the following detailed description when taken in conjunction with the accompanying drawings.

DETAILED DESCRIPTION

Figure 1:
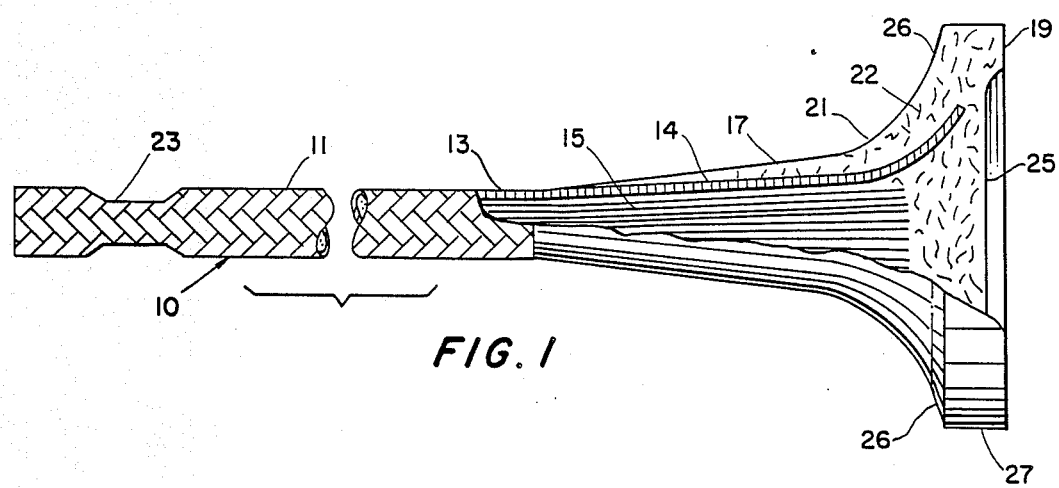
FIG. 1 shows a partially sectioned elevational view of a preform valve fabricated in accordance with this invention.

Finished ceramic composite valves and preforms of said finished valves are provided in accordance with this invention. Each finished valve and preform valve has an elongated valve stem portion which is shaped for insertion in the valve guide of an engine and comprises a fibrous ceramic sleeving which is packed with an axially aligned unidirectional cluster of ceramic reinforcing fibers; and a ceramic bell portion which is shaped for mating with the valve seat of an engine and contains discontinuous ceramic fibers. As used herein, the description of the fibers packed within the stem sleeving as an axially aligned unidirectional cluster of fibers means that either the individual fibers themselves or strands thereof are generally parallel to the elongated dimension of the stem. Typically strands (or tows) of multiple fibers are used, and although the individual fibers may not then themselves necessarily be parallel to the stem axis of elongation, depending on the wind of the strand (or tow), each strand (or tow) is generally parallel to said axis so that the cluster is axially aligned and unidirectional, thereby providing stiffness to resist deformation. In any case, the directional nature of the fiber cluster over the length of the stem allows for relatively close packing of the fibers and thus a strong relatively stiff fiber cluster. The discontinuous ceramic fibers of the bell need not be aligned and are typically more nearly randomly oriented. In some fabrication techniques the discontinuous fibers of the bell may tend to parallel the surface contours of the bell. One end of the stem sleeving is molded into the bell to form a valve-shaped structure therewith. Preferably this end of the stem is outwardly flared to facilitate the contact of the stem material with the bell material and to advantageously reinforce the shaped bell.

Stem sleeving diameter can vary over a wide range. A preferred sleeving is formed of braided strands of ceramic fibers. Braided ceramic sleeving is commercially available from several sources. Sleevings can be fabricated from various fibrous materials such as aluminum borosilicate, silica, silicon carbide, and carbon/graphite fibers. Preferred materials include aluminum borosilicate and silica because of their resistance to oxidation under engine conditions. In a preferred embodiment, braided sleeving may be made using strands of fibers 5 to 20 microns in diameter.

The sleeving is packed along its interior length with axially aligned unidirectional cluster of ceramic reinforcing fibers. The choice of fiber materials ordinarily involves consideration of chemical and mechanical compatibility with other valve materials, the desired valve uses, and the valve fabrication technique employed. Typically such fibers are made of aluminum borosilicate, alumina, silica, carbon/graphite, silicon carbide, silicon nitride and other similar high temperature fibers. We prefer carbon/graphite fibers because they are generally strong and stiff, have low densities and low thermal expansion characteristics, and are good thermal conductors. The materials for the discontinuous ceramic fibers of the bell are generally selected from the same group of materials suitable for the axially aligned stem fiber cluster (e.g. aluminum silicate or borosilicate, alumina, silica, carbon/graphite, silicon carbide, silicon nitride, or mixtures of such fibers).

The finished valves provided in accordance with this invention comprise the bell, and the stem (including the sleeving and the reinforcing fibers pack within the sleeving) as described above, and as described below are rigidized and impregnated with a matrix of carbon and/or other suitable ceramic material, and are coated with a hard ceramic for wear resistance. Matrix materials include carbon and/or other ceramic materials and are chosen for chemical and mechanical compatibility with the fibers. Carbon is a preferred matrix material because of its general compatibility with many fiber materials and its low density and good thermal conductivity. However, for engine environments where excessive carbon oxidation could occur through the outer coating and sleeving, it may be preferable to use other ceramic matrix material such as alumina silica, silicon nitride, and/or silicon carbide.

The rigidized and densified preform valve is coated with a hard ceramic coating which is chemically and mechanically compatible with the underlying preform materials and is resistant to oxidation and wear. Silicon carbide and silicon nitride are preferred coating materials.

By "preform valve" we mean an unfinished valve comprising the bell and the stem, (including the sleeving and the reinforcing fibers within the sleeving) whether or not rigidized, whether or not impregnated with a carbon or ceramic matrix (or a precursor thereof) and whether or not coated with a wear resistant coating. Thus while rigidized preform valves are considered useful for handling and subsequent processing, preform valves of various other stages of production are considered within the scope of this invention.

Figure 2:
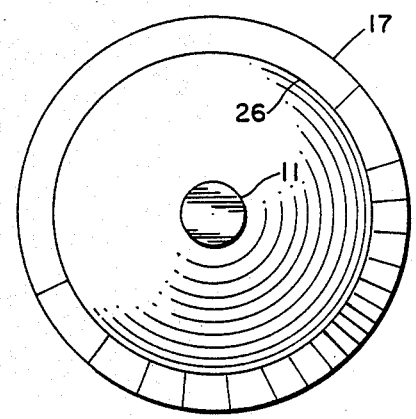
FIG. 2 is a plan view of the preform valve of FIG. 1 taken from the stem end of the preform valve.
Figure 3:
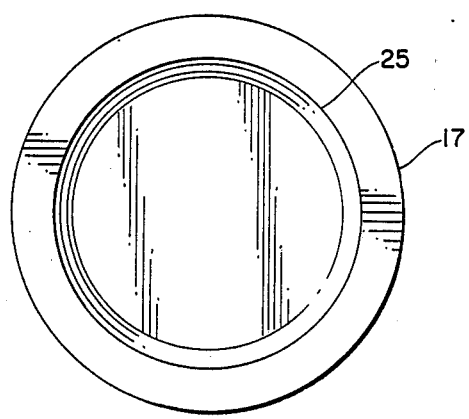
FIG. 3 is a plan view of the preform valve of FIG. 1 taken from the bell end of the preform valve.

Referring now more particularly to the drawings, wherein like numbers refer to like parts throughout the views, a preferred embodiment of a composite preform valve in accordance with this invention is shown generally as (10) in FIG. 1. The preform valve (10) comprises a valve stem (11) which is shaped for insertion in the valve guide of an engine (not shown), and as shown in section at (13) has an elongated braided valve stem sleeving or shell. The braided valve stem sleeving (13) has a flared end (14) and is packed with an axially aligned undirectional cluster of reinforcing fibers (15). The preform valve (10) also comprises a bell portion (17). In the embodiment shown in FIG. 1, the bell portion (17) has a disc (19) and a tapered neck (21), and generally covers and is reinforced by the flared end (14) of the stem sleeving (13). The bell contains discontinuous ceramic fibers represented by (22) in the sectioned portion of FIG. 1. The embodiment shown in FIG. 1 also has an indentation (23) in the stem (11) for a valve retaining ring or other device (not shown), and as also shown in FIG. 3 a depression (25) in the bell (17) which may be desirable for some valve designs. As best shown at (26) in FIG. 1 and FIG. 2 the portion of the bell neck (21) adjacent to the bell disk (19) is conical (i.e. has a flat rather than curved cross section) for the embodiment shown to facilitate sealing of a finished valve fabricated therefrom with the valve seat of an engine (not shown). The disk circumference (27) could also be beveled (not shown) as appropriate to provide a surface suitable for mating with a particular valve seat.

Ceramic valve preforms of the type described may be fabricated in accordance with this invention using a number of fabrication techniques and materials. Both piece work and mass production approaches are contemplated, as are combinations thereof.

The preferred method of fabricating the valves, regardless of the fabrication approach or specific material of fabrication, comprises the steps of providing a flexible elongated sleeving of ceramic fibers which is sized for insertion in the valve guide of an engine and is packed with an axially aligned undirectional cluster of ceramic reinforcing fibers; merging one end of said sleeving into and within a valve bell portion of ceramic material of flexible and plastic consistency which contains discontinuous ceramic fibers to provide a valve-shaped structure; and impregnating and rigidizing said valve-shaped structure with a matrix of carbon and/or other suitable ceramic material. Accordingly the stem and the bell are provided during or after shaping with a matrix in which the fibers are embedded. As noted above the discontinuous fibers contained in the bell portion ceramic may be randomly oriented. Preferably the end of the sleeving which is merged into the bell portion is flared out prior to merging.

In one piece work approach it is desirable to rigidize the merged stem and bell portions in order to facilitate their subsequent processing. In such a piece work approach a valve shaped structure is provided prior to rigidization with voids between the fibers of the structure (i.e. the fibers are not packed to 100% density) and the voids are impregnated with heat-bondable ceramic. This can be readily accomplished by infiltrating the merged stem and bell with a heat-bondable ceramic material to form a valve preform suitable for rigidizing. For example, the stem and bell can be immersed in a sol or other colloidal suspension of ceramic particles, such as colloidal suspensions of silica and/or alumina. The heat-bondable ceramic used should be chemically and mechanically compatible with the fibers and should bond at a relatively low temperature (i.e. less than about 1000° C.). The ceramic-infiltrated bell and stem are then heat treated to bond the heat-bondable ceramic particles and rigidize the valve preform. The ceramic-impregnated structure formed by such heating is a rigidized preform valve having a stem shaped for insertion in the valve guide of an engine and a bell shaped for mating with the valve seat of said engine. The voids present prior to ceramic impregnation are partially filled during rigidization with heat-bondable ceramic which has been bonded.

Figure 4:
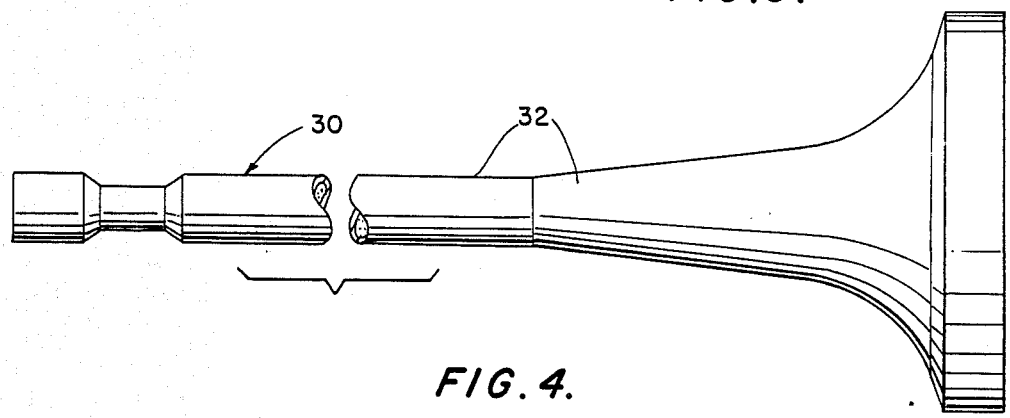
FIG. 4 is an elevational view of a finished valve fabricated in accordance with this invention.

In order to densify the preform valve by further filling the voids with carbon or other ceramic material, the rigidized preform may be impregnated with a matrix precursor material. Finished valves may thus be fabricated from such preform valves by further processing which includes impregnating said rigidized preform valves with a carbon precursor resin, another ceramic matrix precursor, or mixtures thereof (optionally along with particulate ceramic fillers) and pyrolyzing the precursor in situ to yield a ceramic fiber reinforced composite; and coating said ceramic fiber reinforced composite preform with a hard ceramic coating which is resistant to oxidation and wear (e.g. coating with silicon carbide, silicon nitride, or a mixture thereof using chemical vapor deposition (CVD)). More than one impregnation-pyrolysis cycle may be used to obtain the desired matrix character. Coating application may follow, or overlap with, matrix development. One embodiment of a finished valve is shown at (30) in FIG. 4 and as shown has a coating (32) which covers both the stem and bell thereof.

Accordingly, the matrix may be provided at least in part by pyrolyzing matrix precursors. Matrix precursors, regardless of the fabrication technique, are typically a colloidal suspension, a sol, or a preceramic polymer which is converted to a rigid ceramic matrix by heating to a sufficient temperature. Preceramic polymers that pyrolyze upon heating to form a matrix of carbon, silicon nitride, silicon carbide, silica or a mixture thereof are of particular interest.

It may also be advantageous to include filler particles along with some matrix precursors, especially preceramic polymers. Such fillers should be selected to be compatible with both the processing conditions (e.g. infiltration and temperature) and performance characteristics desired (e.g. hardness, wear, and oxidation resistance) of the resultant composite. There are a variety of available carbon precursor resins which might be used (e.g. furan resins and phenol resins). Carbon precursor resins are generally low cost, low density materials which are suitable for many applications. Besides carbon precursors, other ceramic precursors can be used, e.g., polysilanes, polycarbosilanes or polysilazanes. All these may be used to provide a ceramic matrix; and ceramic precursors such as polysilanes may be preferred in applications where long-term resistance to oxidation and wear are particularly important. When a precursor material is use, it is pyrolyzed in situ to yield a rigidized and densified ceramic composite valve preform. Pyrolysis for carbon, carbide, or nitride matrix formation should be performed under non-oxidizing conditions (e.g. in a nitrogen atmosphere). This impregnation with precursor and pyrolysis process may be repeated several times to produce a highly densified composite.

It is considered that various of the steps of the piece work approach to preparing the preforms of the current invention as illustrated above could be feasibly combined in accordance with conventional processing technology. For example it is considered that sleevings enclosing axially aligned unidirectional fibers and impregnated with heat-bondable ceramic, and optionally matrix precursor material as well, could be produced using conventional pultrusion technology. Indeed, it is considered that mass production approaches to fabricating the finished valves or the preform valves would generally involve forming the valve stem, the valve bell, or even a valve shaped structure comprising both the valve stem and the bell from material which already contains the matrix of carbon and/or other suitable ceramic or a precursor of said matrix impregnated within. This can be accomplished by various standard techniques, including injection molding, compression molding, extrusion and pultrusion. Injection molding, compression molding and extrusion are generally associated with processing discontinuous fibers and are thus most suitable for forming the bell section of the valve, but may be used for forming stem portions where reasonably alined discontinuous fibers are suitable for stem needs. When fiber alignment can be sustained, such as by extruding stem preforms, then the bell portion can be formed onto the stem by subsequently molding (e.g. by compression or injection molding). Also, it is feasible to infiltrate and form the matrix in a fiber preform by chemical vapor infiltration. Those skilled in the art will recognize the trade-off between economy and performance (e.g. stiffness) between a stem comprising an aligned cluster of continuous fibers and a stem comprising a generally aligned cluster of discontinuous fibers.

It is readily apparent that various combinations of the piece work and mass production approaches could be used. For example, a stem formed by the piece work approach described above could have a bell injection or compression molded onto it.

A simple way to pack the sleeving is to braid strands of ceramic sleeving fibers around the cluster of reinforcing fibers as both emerge from the braid-forming apparatus. Pultrusion is considered a suitable technique for forming clusters of continuous fibers, upon which fiber tows infiltrated with matrix precursor could be wound by filament winding techniques to form a sleeving. Alternatively, one might extrude or pultrude a stem core into braided sleeving which has been expanded (e.g. by compression). On a smaller scale a bundle of fibers can simply be stuffed by hand into the sleeve. In any case, a packed sleeve of selected length, typically about 6 inches long is made. Preferably it should be filled with a unidirectional cluster of continuous fibers of about the same length as shown at (15) in FIG. 1.

The bell can be shaped by conventional means such as molding from ceramic material of flexible and plastic consistency which can be hardened by heating (e.g. colloidal silica or alumina or alkali metal silicate) and contains discontinuous ceramic fibers which are typically randomly oriented or are oriented along the surface contours of the bell.

A preferred method of coating uses chemical vapor deposition. CVD is a well-known process for depositing coatings such as silicon carbide and/or silicon nitride on suitable heat-resistant substrates. In using CVD, the preform valve would, for example, be positioned in a heated (e.g. 1000° C.) chamber. Silicon tetrachloride and methane for example enter the chamber and partially dissociate and react in contact with the heated surfaces, thereby depositing a coating of silicon carbide on the valve. If ammonia is substituted for methane, silicon nitride is deposited. A mixture of methane and ammonia with silicon tetrachloride will deposit a mixture of silicon carbide and silicon nitride. Such external coatings are dense, extremely hard, and impart prolonged wear resistance to the valve.

The finished composite is highly resistant to wear, impacts, stress, heat, and engine fumes. It is light and dimensionally stable at use temperatures. For embodiments where carbon/graphite fibers and matrix can be used, the resulting finished valve is especially light.

Surface finishing or machining could be used to enhance uniformity in the finished valves. In many cases our valve-forming process is sufficiently exact to make valves conforming to preset dimension tolerances with minimal machining.

Those skilled in the art will recognized that although the valve characteristics resulting from various fabrication approaches will be similar, they are not necessarily identical. Accordingly, the selection of processing approaches, like selection of the materials used in fabricating the valves can be influenced by performance and cost limitations.

Typical performance considerations typically include the mass of the valve, its wear resistance, its resistance to erosion and corrosion (including oxidation), and its overall mechanical reliability. Material selection will be influenced by these considerations. For example, inasmuch as low mass is desired, use of materials of low density (e.g. carbon) will be favored. Mechanical reliability may be increased by using materials which are strong and resistant to both mechanical fracture and thermal stress (e.g. lower thermal expansion materials with fracture toughness such as carbon, silica, or silicon nitride).

Practice of the invention will become further apparent from the following non-limiting example.

EXAMPLE I

A partial prototype valve preform (but without the axially aligned unidirectional ceramic reinforcing fibers within the sleeving) was fabricated starting with a flexible braided ceramic sleeving of about ⅛-inch inner diameter. The sleeving used in this example was a section of braided aluminum borosilicate fiber ("Nextel" from 3M Corporation) about 6 inches long. The braids used were strands of a plurality of very fine fibers, typically about 10-12 microns in diameter.

The section of sleeving was saturated with colloidal $Al_2O_3$ and a portion of the sleeving toward an end was indented (See (23) in FIG. 1), to illustrate adaptation of the stem to accept a valve retainer ring of an engine, and this end of the sleeve was heated to dryness using a hand-held hot air gun. The other end of the sleeve was flared (See (14) in FIG. 1) using the rounded end of a pestle as a shaping mandrel. This involved expanding the braid over the rounded end of the pestle to form the flared shape. The flared end and the previously untreated portion of the sleeving were saturated with colloidal $Al_2O_3$ and heated to dryness as done earlier with the other section. The flared end of the sleeving was then trimmed and the bell portion was molded onto the inner and outer surfaces of the flared end and shaped to the appropriate final form using a felt-like fibrous ceramic material of flexible plastic consistency (a wet felt ceramic material from Refractory Products Co., Elgin, Ill., comprising randomly oriented discontinuous aluminum silicate fibers with binder believed to be a silicate).

The whole assembly was oven dried at 65° C. and then shaped to its final configuration by sanding and filing operations to smooth the surfaces and make the shape more regular. The assembly was about 4.5 inches in length, the bell disc was about 1 5/16 in diameter and the exposed length of sleeving, extending from the molded bell material was about 3⅛ inches long and about 3/16 inches outer diameter. The entire assembly was then reimpregnated with colloidal $Al_2O_3$ under vacuum to ensure complete penetration, and oven dried at 75°-125° C. The assembly was then heated in air to 500° C. for one (1) hour to heat bond the colloidal alumina to make the preform rigid and water insensitive for continued processing.

Next, the rigidized preform was impregnated with a furan resin as a carbon precursor resin. The purpose of resin impregnation was to fill all remaining internal voids in the composite valve preform with resin which is ultimately pyrolyzed to yield carbon, thereby yielding a ceramic fiber-reinforced carbon composite generally shaped as shown in FIG. 1 (but without the unidirectional fibers (15)). The resin was heat treated to set the resin within the rigidized preform. In this example the resin was not pyrolyzed, as would be the case in completing a finished valve.

In this example, no undirectional fibers were contained within the braided sleeving. This avoided any difficulties in maintaining their alignment since the composite assembly was performed by hand and the fibers would not be evident in the completed partial prototype. In actual practice, unidirectional fibers could be placed within the braiding as by inserting them into the sleeving or by over-braiding the sleeving onto the fibers.

The partial prototype valve preform of the example was of generalized shape, and not shaped for use with any particular engine. In actual practice, the finished valve would be carefully dimensioned for use with a particular engine.

Also in the example the CVD coating used in fabricating the finished valves of this invention was not applied and no surface finishing of such a coating was thus performed. Such steps are considered conventional and were not considered necessary for demonstrating the novel aspects of this invention.

It is understood that the foregoing detailed description is given merely by way of illustration and that many variations may be made therein without departing from the spirit of this invention. For example, the invention process as described produces a valve of circular cross-section throughout; however, valves of other cross-sections can be made. It is further understood that the invention is not confined to the particular formulations and examples herein illustrated, but embraces such modified forms thereof as come within the scope of the following claims.

What is claimed is:

1. A finished ceramic composite valve for an internal combustion engine or the like, or a preform valve, including:
   (a) an elongated valve stem shaped for insertion in the valve guide of an engine and comprising fibrous ceramic sleeving which is packed with an axially aligned unidirectional cluster of ceramic reinforcing fibers; and
   (b) a ceramic bell shaped for mating with the valve seat of an engine and containing discontinuous ceramic fibers; one end of the stem sleeving being molded into the bell to form a valve-shaped structure.

2. A finished valve or a preform valve according to claim 1 further comprising a matrix of carbon, of other ceramic material, or of both carbon and other ceramic material in which the fibers of the stem and bell are embedded.

3. A finished valve or a preform valve according to claim 2 further comprising an external coating of wear resistant ceramic.

4. A finished valve or a preform valve according to claim 1 wherein the end of the sleeving which is molded into the bell is flared.

5. A finished valve or a preform valve according to claim 4, wherein the sleeving is braided and the flared stem sleeving end is merged into the bell portion in such manner that the exterior of the bell portion covers the said flared end and is reinforced by said flared end.

6. A finished valve or a preform valve according to claim 5 wherein the braided ceramic sleeving fiber and the bell fiber are aluminum borosilicate; and wherein the cluster of reinforcing fibers is carbon/graphite fibers; said valve or valve preform being rigidized with heat-bonded alumina, impregnated with carbon, and coated with silicon carbide, silicon nitride, or both.

7. A finished valve or a preform valve according to claim 1 wherein the sleeving is aluminum borosilicate, and is packed with carbon/graphite reinforcing fibers; and wherein the bell contains randomly oriented fibers of aluminum silicate.

8. A finished valve or a preform valve according to claim 1 wherein said valve or valve preform is rigidized with heat-bondable alumina.

9. A finished valve or a preform valve according to claim 8 wherein the valve or valve preform comprises a carbon or other ceramic matrix produced by in situ pyrolysis of a carbon precursor resin or other ceramic matrix precursor.

10. A finished valve or a preform valve according to claim 9 wherein the matrix is a carbon matrix produced from a carbon precursor resin.

11. A finished valve or a preform valve according to claim 9 further comprising a hard ceramic coating which is resistant to oxidation and wear.

12. A finished valve or a preform valve according to claim 11 wherein the coating is silicon carbide, silicon nitride or a mixture thereof which has been applied by chemical vapor deposition.

13. Method of making a ceramic valve or a preform valve comprising the steps of:
(i) providing a flexible elongated sleeving of ceramic fibers which is sized for insertion in the valve guide of an engine and is packed with an axially aligned unidirectional cluster of ceramic reinforcing fibers;
(ii) merging one end of said sleeving into and within flexible ceramic valve bell portion containing discontinuous randomly oriented ceramic fibers to provide a valve-shaped structure; and
(iii) impregnating and rigidizing said shaped structure with a matrix of carbon, of other ceramic material, or of both carbon and other ceramic material.

14. The method of claim 13 wherein the sleeving is braided fibers of aluminum borosilicate; wherein the end of the sleeving which is merged into the bell portion is flared out prior to merging; wherein the cluster of fibers packed within the sleeving is a cluster of carbon/graphite fibers; wherein the bell portion contains randomly oriented aluminum silicate fibers; and wherein the matrix comprises carbon.

15. The method of claim 13 wherein the valve shaped structure formed in step (ii) has voids; and wherein step (iii) comprises impregnating the valve-shaped structure with a heat-bondable ceramic, and heating the ceramic-impregnated structure to form a rigidized preform valve having a stem shaped for insertion in the valve guide of an engine and a bell shaped for mating with the valve seat of an engine.

16. The method of claim 15 wherein the voids are partially filled during rigidization; and wherein step (iii) further comprises impregnating the rigidized preform valve with a carbon precursor resin or other ceramic matrix precursor; and pyrolyzing the precursor in situ to yield a ceramic fiber-reinforced composite.

17. The method of claim 16 wherein the sleeving is braided fibers of aluminum borosilicate; wherein the end of the sleeving which is merged into the bell portion is flared out prior to merging; wherein the cluster of fibers packed within the sleeving is a cluster of carbon/graphite fibers; wherein the bell portion contains randomly oriented aluminum silicate fibers; wherein the heat-bondable ceramic is alumina; and wherein the precursor is a furan or phenolic resin.

18. The method of claim 16 further comprising the step of (iv) coating said ceramic fiber-reinforced composite with a ceramic coating which is resistant to oxidation and wear.

19. The method of claim 18 wherein said ceramic coating is silicon carbide, silicon nitride or a mixture thereof.

20. The method of claim 18 wherein ceramic fiber-reinforced composite is coated by chemical vapor deposition.

21. The method of claim 19 wherein the sleeving is braided fibers of aluminum borosilicate; wherein the end of the sleeving which is merged into the bell portion is flared out prior to merging; wherein the cluster of fibers packed within the sleeving is a cluster of carbon/graphite fibers; wherein the bell portion contains randomly oriented aluminum silicate fibers; wherein the heat-bondable ceramic is alumina; wherein the precursor is a furan or phenolic resin; and wherein said ceramic coating is silicon carbide, silicon nitride or a mixture thereof.

22. The method of claim 13 wherein the valve-shaped structure is formed from material which contains said matrix or a precursor thereof impregnated within.

23. The method of claim 22 further comprising the step of (iv) coating said ceramic fiber-reinforced composite with a ceramic coating which is resistant to oxidation and wear.

24. The method of claim 23 wherein said ceramic coating is silicon carbide, silicon nitride or a mixture thereof.

25. A ceramic composite valve for an internal combustion engine or the like including:
(a) an elongated valve stem shaped for insertion in the valve guide of an engine and comprising a ceramic sleeving which is packed with an axially aligned unidirectional cluster of ceramic reinforcing fibers; and
(b) a ceramic bell shaped for mating with the valve seat of an engine and containing discontinuous ceramic fibers; one end of said valve stem sleeving being molded into the bell to form a valve-shaped structure; and said valve shaped structure being impregnated and rigidized with a matrix of carbon, other ceramic material or both carbon and other ceramic material, and coated with a hard ceramic coating which is resistant to oxidation and wear.

26. The ceramic composite valve of claim 21 wherein the sleeving is braided aluminum borosilicate; wherein the end of the sleeving which is molded into the bell is flared; wherein the cluster of ceramic reinforcing fibers is carbon/graphite; wherein the bell contains randomly oriented aluminum silicate fibers; and wherein the valve shaped structure is rigidized with alumina or silica, impregnated with carbon, and coated with silicon carbide, silicon nitride or a mixture thereof.

* * * * *